US008344901B2

(12) United States Patent
Tysowski et al.

(10) Patent No.: US 8,344,901 B2
(45) Date of Patent: *Jan. 1, 2013

(54) METHOD AND HANDHELD ELECTRONIC DEVICE FOR DETECTING AND PROVIDING NOTIFICATION OF A DEVICE DROP

(75) Inventors: Piotr Konrad Tysowski, Waterloo (CA); Martin Arastafar, Redwood City, CA (US)

(73) Assignee: Research In Motion Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/240,573

(22) Filed: Sep. 22, 2011

(65) Prior Publication Data

US 2012/0007745 A1   Jan. 12, 2012

Related U.S. Application Data

(62) Division of application No. 12/360,153, filed on Jan. 27, 2009, now Pat. No. 8,044,818.

(51) Int. Cl.
  *G08B 21/00*   (2006.01)
(52) U.S. Cl. ................ 340/669; 340/540; 455/550.1
(58) Field of Classification Search .............. None
  See application file for complete search history.

(56) References Cited

U.S. PATENT DOCUMENTS

| | | | |
|---|---|---|---|
| 4,876,532 A | 10/1989 | Sauls | |
| 6,236,868 B1 | 5/2001 | Lygas | |
| 6,940,407 B2 * | 9/2005 | Miranda-Knapp et al. | 340/572.1 |
| 7,059,182 B1 | 6/2006 | Ragner | |
| 7,084,759 B2 | 8/2006 | Cox et al. | |
| 7,180,425 B2 | 2/2007 | Yuasa | |
| 7,541,551 B2 | 6/2009 | Wehrenberg | |
| 8,044,818 B2 * | 10/2011 | Tysowski et al. | 340/669 |
| 2001/0038067 A1 | 11/2001 | Henoch | |
| 2004/0113778 A1 | 6/2004 | Script et al. | |
| 2006/0028339 A1 * | 2/2006 | Ogino et al. | 340/539.32 |
| 2007/0026852 A1 * | 2/2007 | Logan et al. | 455/422.1 |
| 2008/0191892 A1 | 8/2008 | Kirkup et al. | |

FOREIGN PATENT DOCUMENTS

| | | |
|---|---|---|
| DE | 20303025 U1 | 4/2003 |
| DE | 102005047711 A1 | 4/2007 |
| JP | 200032167 A | 1/2000 |
| WO | WO 2005025187 A2 | 3/2005 |
| WO | WO 2007116211 A1 | 10/2007 |

OTHER PUBLICATIONS

EESR, corresponding EP application No. 09151414.1 dated Aug. 5, 2009.
EESR, corresponding EP application No. 09151414.1 dated Jan. 7, 2010.

* cited by examiner

Primary Examiner — Travis Hunnings
(74) Attorney, Agent, or Firm — Novak Druce + Quigg LLP

(57) ABSTRACT

A method and handheld electronic device for detecting and providing notification of a device drop are provided. In accordance with one embodiment, there is provided a method for providing notification of a device drop on an electronic device having a processor coupled to a memory and an accelerometer, the method comprising: receiving an input from the accelerometer; and issuing an alert when the input indicates a freefall event and at least one secondary indication of a device drop exists.

20 Claims, 3 Drawing Sheets

METHOD AND HANDHELD ELECTRONIC DEVICE FOR DETECTING AND PROVIDING NOTIFICATION OF A DEVICE DROP

CROSS-REFERENCE TO RELATED APPLICATIONS

This application is a continuation of U.S. patent application Ser. No. 12/360,153, filed Jan. 27, 2009, the content of which is incorporated herein by reference.

TECHNICAL FIELD

The present disclosure relates to device notification systems, and more particularly to a method and handheld electronic device for detecting and providing notification of a device drop.

BACKGROUND

Handheld electronic devices are easily lost due to their small size and the variety of places and situations where such devices are carried and used. It is not uncommon for a device user to lose his or her device when it falls out of a pocket, bag, carrying case, holster, etc. Unless the device user hears the device hit the ground or feels the device slip away, the device is likely to be left where it falls. While solutions exist which allow users to attempt locate lost devices, these solutions are only useful after the device loss has been discovered by the user. Often significant time has past since the device has been lost and the device user can attempt to recover the device. This increases the chance that the lost device will not be recovered, and inconveniences the user even when the device can be recovered due to the lost time without the device, and the time and cost associated with retrieving the device or having the device delivered to the user.

Thus, there remains a need for improved device notification systems, and more particularly to improved methods and handheld electronic devices for detecting and providing notification of a device drop.

DETAILED DESCRIPTION OF EXAMPLE EMBODIMENTS

Figure 1:
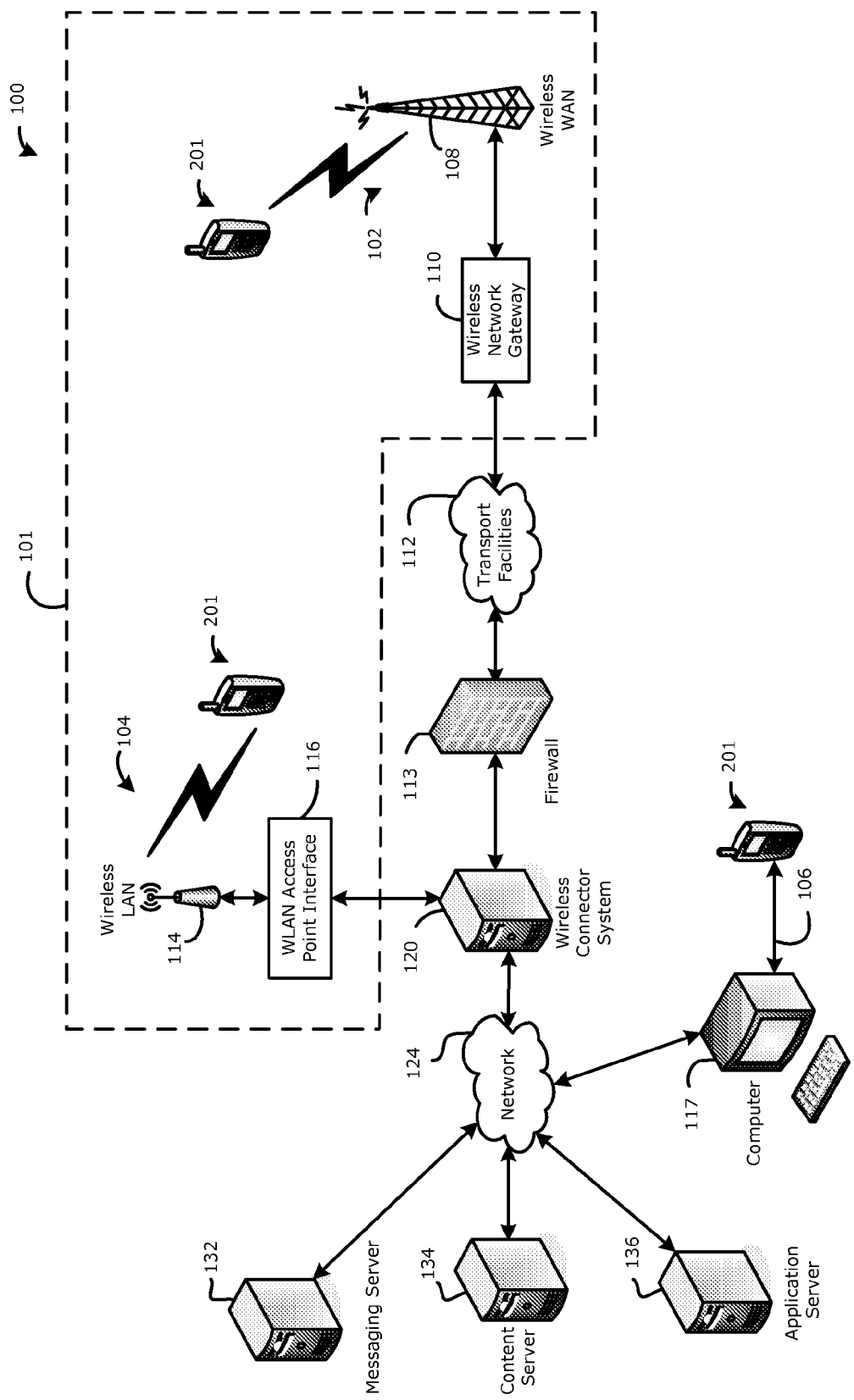
FIG. 1 is a block diagram illustrating a communication system including a mobile communication device to which example embodiments of the present disclosure can be applied.

The present disclosure is directed to a method and handheld electronic device adapted to reduce the likelihood of a device loss by issuing an alert when the device detects conditions which indicate a loss or potential loss of the device. This allows the device user to be automatically notified when the device is initially lost, which is the time at which the device is most likely to be recovered. This increases the chances of device recovery and decrease the inconvenience associated with recovering the lost device.

In accordance with one embodiment, there is provided a method for providing notification of a device drop on an electronic device having a processor coupled to a memory and an accelerometer, the method comprising: receiving an input from the accelerometer; and issuing an alert when the input indicates a freefall event and at least one secondary indication of a device drop exists.

In accordance with another embodiment, there is provided a method for providing notification of a device drop on an electronic device having a processor coupled to a memory and an accelerometer, the method comprising: receiving an input from the accelerometer; and issuing an alert when the input indicates a freefall event, the issuing including sending an electronic communication to a designated address over a wireless communication link, the electronic communication including a map of a location of the electronic device.

In accordance with one embodiment, there is provided a method for providing notification of a device drop on an electronic device having a processor coupled to a memory and an accelerometer, the method comprising: receiving an input from the accelerometer; and issuing an alert when the input indicates a freefall event.

In accordance with yet a further embodiment of the present disclosure, there is provided a handheld electronic device, comprising: a controller for controlling the operation of the device; an accelerometer coupled to the controller for measuring acceleration; the controller being configured for causing the handheld electronic device to perform the described methods.

In accordance with a further embodiment of the present disclosure, there is provided a computer program product comprising a computer readable medium storing instructions in the form of executable program code for causing the handheld electronic device to perform the described methods.

The embodiments described herein generally relate to handheld electronic devices. Examples of handheld electronic devices include mobile communication devices such as pagers, cellular phones, Global Positioning System (GPS) navigation devices and other satellite navigation devices, smart phones, wireless organizers and personal digital assistants. The handheld electronic device may also be a portable electronic device without wireless communication capabilities such as handheld electronic game devices, digital photograph albums and digital cameras. In some embodiments, the teachings of the present disclosure could be applied to notebook computers such as wireless-enabled notebook computers.

Figure 2:
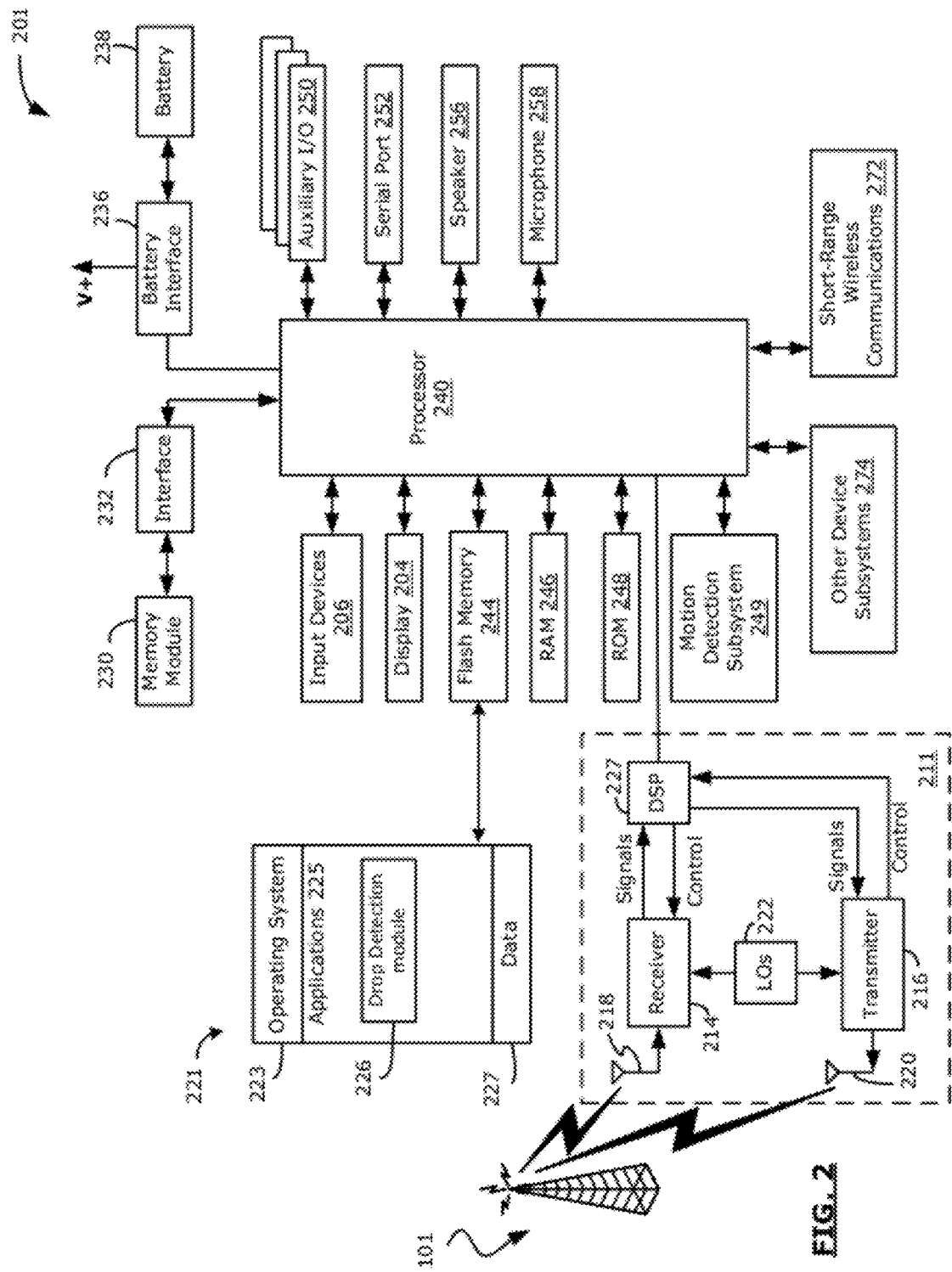
FIG. 2 is a block diagram illustrating a mobile communication device in accordance with one example embodiment of the present disclosure.

Reference is now made to FIG. 2 which illustrates a mobile communication device 201 in which example embodiments described in the present disclosure can be applied. The mobile communication device 201 is a two-way communication device having at least data and possibly also voice communication capabilities, and the capability to communicate with other computer systems, for example, via the Internet. Depending on the functionality provided by the mobile communication device 201, in various embodiments the device may be a data communication device, a multiple-mode communication device configured for both data and voice communication, a smartphone, a mobile telephone or a PDA (personal digital assistant) enabled for wireless communication, or a computer system with a wireless modem.

The mobile communication device 201 includes a rigid case (not shown) housing the components of the device 201. The internal components of the device 201 are constructed on a printed circuit board (PCB). The mobile communication device 201 includes a controller comprising at least one processor 240 (such as a microprocessor) which controls the overall operation of the device 201. The processor 240 interacts with device subsystems such as a communication subsystem 211 for exchanging radio frequency signals with a wireless network 101 to perform communication functions. The processor 240 interacts with additional device subsystems including a display (screen) 204 such as a liquid crystal display (LCD) screen, input devices 206 such as a keyboard and control buttons, flash memory 244, random access memory (RAM) 246, read only memory (ROM) 248, auxiliary input/output (I/O) subsystems 250, data port 252 such as serial data port, such as a Universal Serial Bus (USB) data port, speaker 256, microphone 258, short-range communication subsystem 272, and other device subsystems generally designated as 274. Some of the subsystems shown in FIG. 2 perform communication-related functions, whereas other subsystems may provide "resident" or on-device functions.

The device 201 may comprise a touchscreen display in some embodiments. The touchscreen display may be constructed using a touch-sensitive input surface connected to an electronic controller and which overlays the display screen 204. The touch-sensitive overlay and the electronic controller provide a touch-sensitive input device and the processor 240 interacts with the touch-sensitive overlay via the electronic controller.

The communication subsystem 211 includes a receiver 214, a transmitter 216, and associated components, such as one or more antenna elements 218 and 220, local oscillators (LOs) 222, and a processing module such as a digital signal processor (DSP) 224. The antenna elements 218 and 220 may be embedded or internal to the mobile communication device 201 and a single antenna may be shared by both receiver and transmitter, as is known in the art. As will be apparent to those skilled in the field of communication, the particular design of the wireless communication subsystem 211 depends on the wireless network 101 in which mobile communication device 201 is intended to operate.

The mobile communication device 201 may communicate with any one of a plurality of fixed transceiver base stations 108 of the wireless network 101 within its geographic coverage area. The mobile communication device 201 may send and receive communication signals over the wireless network 101 after the required network registration or activation procedures have been completed. Signals received by the antenna 218 through the wireless network 101 are input to the receiver 214, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 224. In a similar manner, signals to be transmitted are processed, including modulation and encoding, for example, by the DSP 224. These DSP-processed signals are input to the transmitter 216 for digital-to-analog (D/A) conversion, frequency up conversion, filtering, amplification, and transmission to the wireless network 101 via the antenna 220. The DSP 224 not only processes communication signals, but may also provide for receiver and transmitter control. For example, the gains applied to communication signals in the receiver 214 and the transmitter 216 may be adaptively controlled through automatic gain control algorithms implemented in the DSP 224.

The processor 240 operates under stored program control and executes software modules 221 stored in memory such as persistent memory, for example, in the flash memory 244. As illustrated in FIG. 2, the software modules 221 comprise operating system software 223, software applications 225 comprising a drop detection module 226. The drop detection module 226 may, among other things, be implemented through a stand-alone software application, or combined together in one or more of the operating system 223 and applications 225. In some example embodiments, the functions performed by the drop detection module 226 may be realized as a plurality of independent elements, rather than a single integrated element, and any one or more of these elements may be implemented as parts of other software applications.

Those skilled in the art will appreciate that the software modules 221 or parts thereof may be temporarily loaded into volatile memory such as the RAM 246. The RAM 246 is used for storing runtime data variables and other types of data or information, as will be apparent to those skilled in the art. Although specific functions are described for various types of memory, this is merely one example, and those skilled in the art will appreciate that a different assignment of functions to types of memory could also be used.

The software applications 225 may include a range of applications, including, for example, an address book application, a messaging application, a calendar application, and/or a notepad application. In some embodiments, the software applications 225 include an email message application, a push content viewing application, a voice communication (i.e. telephony) application, a map application, and a media player application. Each of the software applications 225 may include layout information defining the placement of particular fields and graphic elements (e.g. text fields, input fields, icons, etc.) in the user interface (i.e. the display screen 204) according to the application.

In some embodiments, the auxiliary input/output (I/O) subsystems 250 may comprise an external communication link or interface, for example, an Ethernet connection. The mobile communication device 201 may comprise other wireless communication interfaces for communicating with other types of wireless networks, for example, a wireless network such as an orthogonal frequency division multiplexed (OFDM) network or a GPS transceiver for communicating with a GPS satellite network (not shown). The auxiliary I/O subsystems 250 may comprise a navigational tool such as a clickable trackball or thumbwheel, a digital camera, or a vibrator for providing vibratory notifications in response to various events on the device 201 such as receipt of an electronic communication or incoming phone call, or for other purposes such as haptic feedback (touch feedback).

In some embodiments, the mobile communication device 201 also includes a removable memory card 230 (typically comprising flash memory) and a memory card interface 232. Network access typically associated with a subscriber or user of the mobile communication device 201 via the memory card 230, which may be a Subscriber Identity Module (SIM) card for use in a GSM network or other type of memory card for use in the relevant wireless network type. The memory card 230 is inserted in or connected to the memory card interface 232 of the mobile communication device 201 in order to operate in conjunction with the wireless network 101.

The mobile communication device 201 stores data 227 in an erasable persistent memory, which in one example embodiment is the flash memory 244. In various embodiments, the data 227 includes service data comprising information required by the mobile communication device 201 to establish and maintain communication with the wireless network 101. The data 227 may also include user application data such as email messages, address book and contact information, calendar and schedule information, notepad documents, image files, and other commonly stored user information stored on the mobile communication device 201 by its user, and other data. The data 227 stored in the persistent memory (e.g. flash memory 244) of the mobile communication device 201 may be organized, at least partially, into a number of databases each containing data items of the same data type or associated with the same application. For example, email messages, contact records, and task items may be stored in individual databases within the device memory.

The serial data port 252 may be used for synchronization with a user's host computer system (not shown). The serial data port 252 enables a user to set preferences through an external device or software application and extends the capabilities of the mobile communication device 201 by providing for information or software downloads to the mobile communication device 201 other than through the wireless network 101. The alternate download path may, for example, be used to load an encryption key onto the mobile communication device 201 through a direct, reliable and trusted connection to thereby provide secure device communication.

In some embodiments, the mobile communication device 201 is provided with a service routing application programming interface (API) which provides an application with the ability to route traffic through a serial data (i.e., USB) or Bluetooth® (Bluetooth® is a registered trademark of Bluetooth SIG, Inc.) connection to the host computer system using standard connectivity protocols. When a user connects their mobile communication device 201 to the host computer system via a USB cable or Bluetooth® connection, traffic that was destined for the wireless network 101 is automatically routed to the mobile communication device 201 using the USB cable or Bluetooth® connection. Similarly, any traffic destined for the wireless network 101 is automatically sent over the USB cable Bluetooth® connection to the host computer system for processing.

The mobile communication device 201 also includes a battery 238 as a power source, which is typically one or more rechargeable batteries that may be charged, for example, through charging circuitry coupled to a battery interface such as the serial data port 252. The battery 238 provides electrical power to at least some of the electrical circuitry in the mobile communication device 201, and the battery interface 236 provides a mechanical and electrical connection for the battery 238. The battery interface 236 is coupled to a regulator (not shown) which provides power V+ to the circuitry of the mobile communication device 201.

The short-range communication subsystem 272 is an additional optional component which provides for communication between the mobile communication device 201 and different systems or devices, which need not necessarily be similar devices. For example, the subsystem 272 may include an infrared device and associated circuits and components, or a wireless bus protocol compliant communication mechanism such as a Bluetooth® communication module to provide for communication with similarly-enabled systems and devices.

A predetermined set of applications that control basic device operations, including data and possibly voice communication applications will normally be installed on the mobile communication device 201 during or after manufacture. Additional applications and/or upgrades to the operating system 223 or software applications 225 may also be loaded onto the mobile communication device 201 through the wireless network 101, the auxiliary I/O subsystem 250, the serial port 252, the short-range communication subsystem 272, or other suitable subsystems 274 or wireless communication interfaces. The downloaded programs or code modules may be permanently installed, for example, written into the program memory (i.e. the flash memory 244), or written into and executed from the RAM 246 for execution by the processor 240 at runtime. Such flexibility in application installation increases the functionality of the mobile communication device 201 and may provide enhanced on-device functions, communication-related functions, or both. For example, secure communication applications may enable electronic commerce functions and other such financial transactions to be performed using the mobile communication device 201.

The mobile communication device 201 may provide two principal modes of communication: a data communication mode and an optional voice communication mode. In the data communication mode, a received data signal such as a text message, an email message, or Web page download will be processed by the communication subsystem 211 and input to the processor 240 for further processing. For example, a downloaded Web page may be further processed by a browser application or an email message may be processed by an email message application and output to the display 242. A user of the mobile communication device 201 may also compose data items, such as email messages, for example, using the input devices in conjunction with the display screen 204. These composed items may be transmitted through the communication subsystem 211 over the wireless network 101.

In the voice communication mode, the mobile communication device 201 provides telephony functions and operates as a typical cellular phone. The overall operation is similar, except that the received signals would be output to the speaker 256 and signals for transmission would be generated by a transducer such as the microphone 258. The telephony functions are provided by a combination of software/firmware (i.e., the voice communication module) and hardware (i.e., the microphone 258, the speaker 256 and input devices). Alternative voice or audio I/O subsystems, such as a voice message recording subsystem, may also be implemented on the mobile communication device 201. Although voice or audio signal output is typically accomplished primarily through the speaker 256, the display screen 204 may also be used to provide an indication of the identity of a calling party, duration of a voice call, or other voice call related information.

The mobile communication device 201 also comprises a motion detection subsystem 249 comprising at least one motion sensor which is connected to the processor 240 and which is controlled by one or a combination of a monitoring circuit and operating software. The motion detection subsystem 249 may comprise two or more motion sensors or a motion sensor and an electronic compass. The motion detection subsystem 249 detects the motion of the mobile communication device 201 or detects information which the motion of the mobile communication device 201 can be determined, such as acceleration using an accelerometer. In other embodiments, a motion sensor other than an accelerometer could be used.

As will be appreciated by persons skilled in the art, an accelerometer is a sensor which converts acceleration from motion (e.g. movement of the mobile communication device 201 or a portion thereof due to the strike force) and gravity which are detected by a sensing element into an electrical signal (producing a corresponding change in output) and is available in one, two or three axis configurations. Accelerometers may produce digital or analog output signals depending on the type of accelerometer. Generally, two types of outputs are available depending on whether an analog or digital accelerometer used: (1) an analog output requiring buffering and analog-to-digital (A/D) conversion; and (2) a digital output which is typically available in an industry standard interface such as an SPI (Serial Peripheral Interface) or I2C (Inter-Integrated Circuit) interface. The output of an accelerometer is typically measured in terms of the gravitational acceleration constant at the Earth's surface, denoted g, which is approximately 9.81 m/s$^2$ (32.2 ft/s$^2$) as the standard average. The accelerometer may be of almost any type including, but not limited to, a capacitive, piezoelectric, piezoresistive, or gas-based accelerometer. The range of accelerometers vary up to the thousands of g's, however for portable electronic devices "low-g" accelerometers may be used. Example low-g accelerometers which may be used are MEMS digital accelerometers from Analog Devices, Inc. (ADI), Freescale Semiconductor, Inc. (Freescale) and STMicroelectronics N.V. of Geneva, Switzerland.

Figure 3:
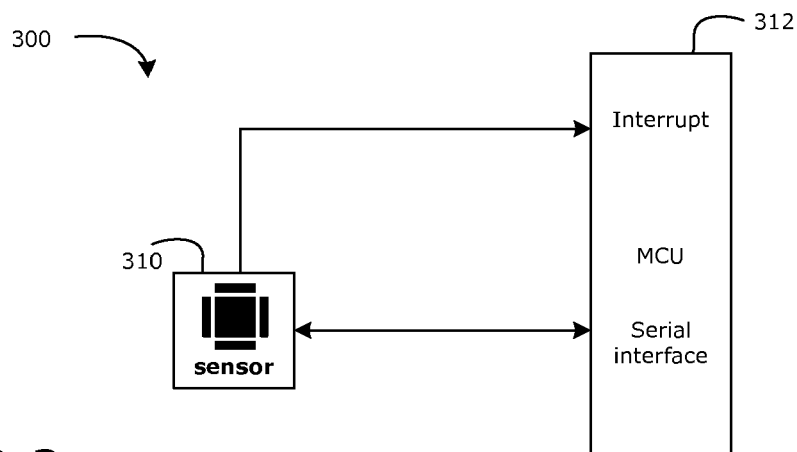
FIG. 3 is a block diagram of a motion detection subsystem comprising a digital 3-axis accelerometer in accordance with one example embodiment of the present disclosure.

Referring briefly to FIG. 3, a motion detection subsystem 249 in accordance with one example embodiment of the present disclosure will be described. The circuit 300 comprises a digital 3-axis accelerometer 310 connected to the interrupt and serial interface of a controller (MCU) 312. The controller 312 could be the processor 240 of the device 201. The operation of the controller 312 is controlled by software, which may be stored in internal memory of the controller 312. The operational settings of the accelerometer 310 are controlled by the controller 312 using control signals sent from the controller 312 to the accelerometer 310 via the serial interface. The controller 312 may determine the motion detection in accordance with the acceleration measured by the accelerometer 310, or raw acceleration data measured by the accelerometer 310 may be sent to the processor 240 of the device 201 via its serial interface where motion detection is determined by the operating system 223, or other software module 221. In other embodiments, a different digital accelerometer configuration could be used, or a suitable analog accelerometer and control circuit could be used.

Figure 4:
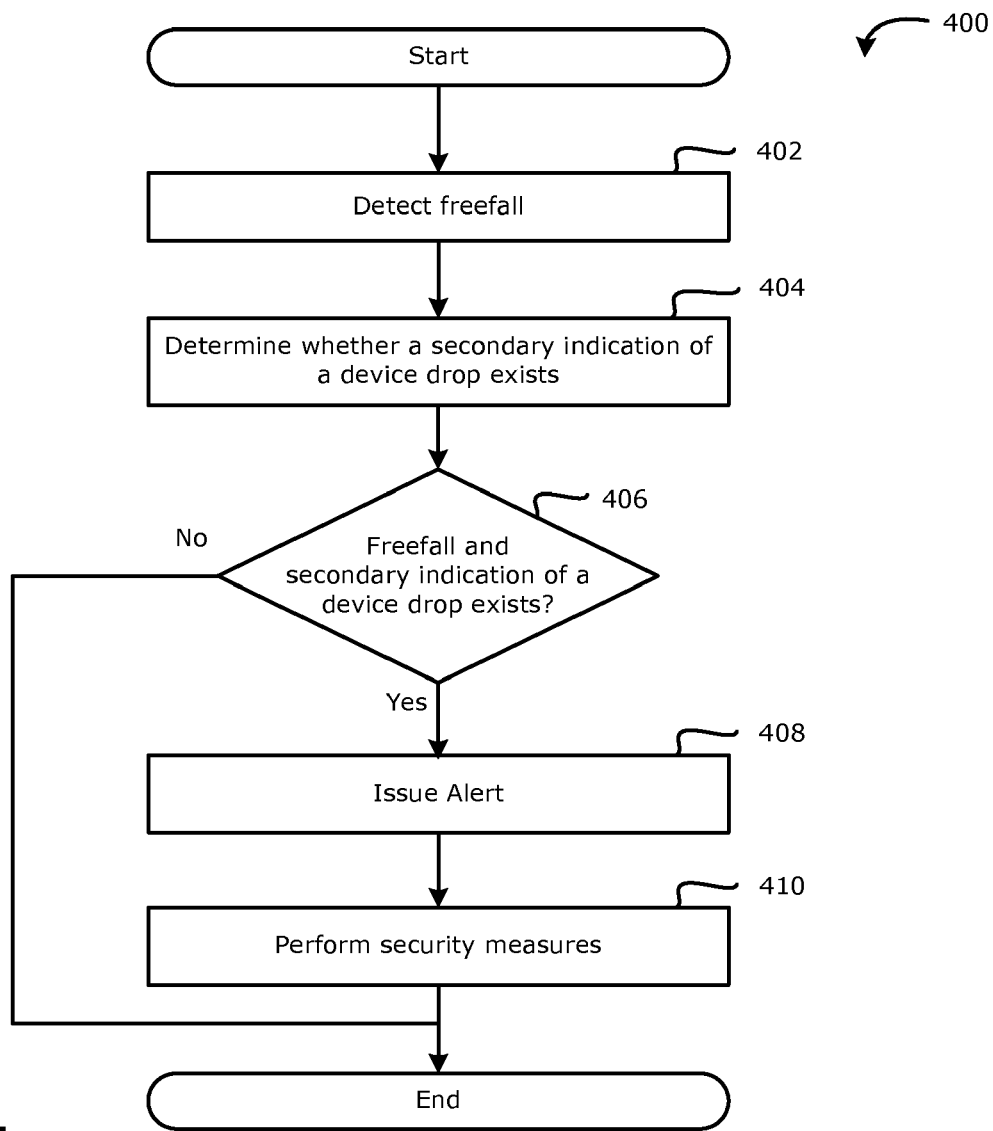
FIG. 4 is a flowchart illustrating example operations for generating an alert in response to drop detection in accordance with one example embodiment of the present disclosure.

Referring now to FIG. 4, a method of detecting and providing notification of a device drop in accordance with one embodiment of the present disclosure will be described. FIG. 4 illustrates example operations 400 for performing the method. In this example embodiment, the operations 400 are carried out by the processor 240 of the handheld electronic device 102 under the instruction of the drop detection module 226. The drop detection module 226 is a separate module 221 in the described embodiment, but in other embodiments may be part of the operating system 223 rather than a particular application 225 so that it can operate irrespective of any active application 225 on the device 201.

In the first step 402, the drop detection module 226 monitors for and detects freefall events. In some embodiments, this comprises monitoring the output of the three-axis accelerometer 310 and detecting an output signal indicating freefall. Freefall may be indicated by an output signal which represents a zero acceleration reading (relative to gravity) from each sensing axis of the accelerometer 310. It will be appreciated that any time there is no external force other than gravity acting on the device 201, for example when the device 201 is falling after being dropped, the accelerometer 310 will report zero acceleration in each of its three sensing axes.

In some embodiments, the accelerometer 310 reports three voltage signals corresponding to the acceleration detected along each sensing axis to the drop detection module 226. The drop detection module 226 monitors the output of the accelerometer 310 for a condition where each signal has a voltage within a predetermined threshold of a zero acceleration reading. As will be appreciated by persons skilled in the art, the accelerometer 310 is configured to output a voltage signal which represents the detected acceleration. Accelerometers measure positive and negative acceleration, often measured in terms of a ±"g" scale. The voltage output of the accelerometer 310 is scaled in accordance with its "g" scale or other acceleration measurement scale. A zero acceleration reading corresponds to an output signal having a voltage associated with a 0 g or "no acceleration" reading.

In other embodiments, the accelerometer 310 reports a single multiplexed signal corresponding to the acceleration detected along each sensing axis. The multiplexing may be performed by the accelerometer 310 or the processor 240 in accordance with the instructions of the operating system 223 or drop detection module 226.

In yet other embodiments, the accelerometer 310 under the instruction of its onboard software reports a freefall signal to the drop detection module 226 when the acceleration detected by all three sensing axes is within a predetermined threshold of zero acceleration. The drop detection module 226 may monitor and detect for the freefall signal, the raw output signals from the accelerometer 310, or both.

To avoid spurious device drop events, in at least some embodiments the drop detection module 226 or the accelerometer 310 must detected acceleration within a predetermined threshold of zero acceleration for a predetermined duration of time. The predetermined duration of time is typically in the order of a few milliseconds. The predetermined duration of time may be selected to represent a freefall and to exclude to gestures or other movements of the device 201 which results in zero acceleration. In some embodiments, the predetermined duration of time may also be selected to represent a freefall of more than a few inches to exclude shorter drops which may indicate that the device 201 was not dropped or was not dropped in a manner which is likely to lead of a device loss (e.g., the device drop was intention).

Next, in step 404 the drop detection module 226 determines whether a secondary indication of a device drop exists. A freefall event may occur as a result of events which are not likely to lead to loss of the device 201. For example, a user might carry the device 201 in a bag, purse or coat, and drop the object carrying the device 201 intentionally. This would likely result in a freefall event being detected. Reporting a device drop event in such circumstances would result in unneeded device drop notifications. Limiting the reporting of device drop events which occur in combination with a secondary indication of a device drop limits device drop reporting to situations in which the device 201 has been dropped in a manner more likely to lead to a device loss.

In some embodiments, the secondary indication of a device drop is the occurrence of an out-of-holster event. An out-of-holster event occurs when removal of the device 201 from its carrying case or holster is detected. The device 201 uses holster-detection means to detect whether it is in a carrying case or holster. The terms "carrying case" and "holster" are used interchangeably in the present disclosure are intended to cover all enclosures for protecting and/or carrying the device 201. The holster-detection means may be implemented using any one or more of a number of different mechanisms. In some embodiments, the holster-detection means may comprise a mechanical sensor such as a depressible button on the surface of the device 201 which is adapted to depress only when the device 201 is held within a specifically-shaped holster. In other embodiments, the holster-detection means may comprise an electrical sensor such as an electrical contact on the surface of the device 201 which is adapted to close an electrical circuit when in contact with another electrical contact on the interior of a specially-designed holster. In other embodiments, the holster-detection means may comprise a magnetically-sensitive sensor as part of the device 201 which is adapted to detect the proximity of a magnet built into a specially-designed holster. Further details of an example implementation of holster-proximity detection means can be found in commonly owned U.S. Patent Application Pub. No. 2008/0191892 A1, published Aug. 14, 2008, which is incorporated herein by reference.

Using the out-of-holster event as a secondary indication of a device drop, the drop detection module 226 reports a device drop event to the operating system 223 when an out-of-holster even has been detected. This excludes from reporting circumstances in which the device 201 is stored in its carrying case or holster inside a bag, purse or coat pocket which is dropped to the floor intentionally: in these cases, it is unlikely that the user is not aware of the drop and so it need not be reported. Instead, the only events reported by the drop detection module 226 are those where the device 201 has fallen while out of its carrying case or holster, possibly as a result of falling out of the carrying case or holster.

In some embodiments, a freefall event may have to be detected more than a predetermined duration from the time an out-of-holster event is detected. This condition may exclude device drop events from being reported when the user drops the device 201 while removing it from the holster. Because the user is likely to be aware of the device drop in such cases, reporting a device drop event in these circumstances would result in undesired reporting of device drop events.

In other embodiments, the secondary indication of a device drop may be closing of the device 201 when the device is a flip-style device or slider-style device. When in the device 201 is closed, it is not in use and therefore a device drop is more likely to result in a loss of the device 201.

In other embodiments, the secondary indication of a device drop may be a lack of activity of the device 201 for a predetermined duration. Activity of the device 201 may be determined by activity of the input devices 206, selected types of communication with the wireless network 101 (e.g., sending a message or an ongoing voice call), or both. Because the user is likely to be aware of the device drop when in use, reporting a device drop in these circumstances would result in undesired reporting of device drop events.

In other embodiments, the secondary indication of a device drop may be a spike in the magnitude (e.g., an increase of at least a predetermined magnitude) of the acceleration detected by the accelerometer 310 within a predetermined duration of the freefall event. A spike in the magnitude of the detected acceleration may indicate the impact of the device 201. When the device 201 hits the ground or other surface at the end of its fall, this results in a rapid change in acceleration from zero to approximately 9.81 m/s$^2$. The detection of an acceleration or change in acceleration which is greater than or equal to a predetermined threshold within a predetermined duration of the freefall event may be used to limit device drop reporting in some embodiments. The predetermined threshold in such embodiments represents a device impact and may be calibrated to represent an acceleration or change in acceleration which is likely to represent an impact resulting from a device drop.

In other embodiments, the secondary indication of a device drop may utilize a camera (not shown) of the device 201. Upon detecting a freefall by the accelerometer 310, the camera is activated to take a series of digital images/pictures (e.g. snap shots) of the device environment while the accelerometer 310 detects a freefall. The series of pictures are then analyzed using digital image recognition and/or other digital image analysis techniques to determine whether the images in the series change in a manner which matches one or more predetermined characteristics associated with the device 201 being in freefall. In relatively simple embodiment, a histogram or average pixel value of each image in the series could be determined by an imaging application on the device 201 and then compared. Alternatively, the first and last images in the series or other subset of images in the series could be analyzed and compared. The change in a reference value of the images which occurs over the series of images (or between the first and last images of the series or subset) is then compared to a predetermined threshold associated with the device 201 being in freefall. If the reference value for comparison is greater than or equal to the predetermined threshold, the device 201 is determined to be in freefall. If the reference value is less than the predetermined threshold, the device 201 is determined not to be in freefall.

Detected changes in device environment could be due to changes in a pattern of flooring resulting from a device drop, such as the pattern of floor tiles increasing in size over the series of pictures, or due to an object such as a picture frame on a wall moving upwardly over the series of pictures. In contrast, little or no change may be detected when the device 201 is in its holster, a pocket, a purse or gym bag. The secondary indication provided by the camera may provide more accurate confirmatory device drop detection than other secondary indications such as out-of-holster events in some circumstances. In addition, because the camera is only triggered after the accelerometer 310 detects a freefall, minimal battery power would be consumed.

The drop detection module 226 may determine whether other secondary indications of a device drop exist in addition to, or instead of, an out-of-holster event.

Next, in step 406 the drop detection module 226 determines if a freefall event has been detected when a secondary indication of a device drop exists (e.g., when the device 201 is out of its holster) or within a predetermined duration of a secondary indication of a device drop. When this occurs, the drop detection module 226 reports a device drop event to the operating system 223 by sending a device drop notification. When no secondary indication of a device drop exists (e.g., the device 201 was in its holster), the operations 400 end.

It will be appreciated that steps 404 and 406 are optional. In other embodiments, the drop detection module 226 reports a device drop event to the operating system 223 when a freefall event is detected without considering any secondary indications of a device drop.

Next, in step 408 in response to receiving a device drop notification from the drop detection module 226, the operating system 223 issues an alert. The type and content of the alert may vary between different embodiments. The alert may comprise one or any combination of a visual, audio and physical indication. The physical indication may be a vibration generated by a buzzer or vibrator of the device 201. The visual indication may be generated by the display screen 204, a light-emitting diode (LED), or both. The audio indication may be generated by the speaker 256, a tone generator, or both. In some embodiments, the user may create a personalized audio recording or synthesized voice recoding to serve as the audio indication.

The operating system 223 may also initiate a lost device mode which could be used to determine when to stop issuing alerts when periodic or repeating alerts are issued by the device 201. The lost device mode could also be used in combination with security measures, as described below. In initiating the lost device mode, the device 201 may change a lost device setting or flag on the device 201 to true. When the device 201 is recovered and it is not in a locked mode, the movement of the device 201 and/or activity via the input devices 206 provides an indication that the device 201 is recovered and the lost device setting is changed to false, thereby terminating the lost device mode. When the device 201 is recovered and it is in a locked mode, the device user must enter a predetermined password via the input devices 206 to unlock the device 201. After unlocking, the lost device setting is changed to false.

In some embodiments, initiating the lost device mode automatically initiates the locked mode. In other embodiments, initiating the lost device mode may change the duration of a countdown timer for initiating the locked mode from an initial value to a second, shorter value. As will be appreciated by persons skilled in the art, the countdown timer may be triggered by one or more of a number of trigger conditions including: inactivity for a predetermined duration (for example, as measured by a lack of input via the input devices 206), loss of communication with the wireless network 101, holstering of the device 201 if the device is holsterable, or closing of the device 201 if the device is a flip-style device or slider-style device. When in the locked mode, the functionality of the device 201 is restricted. In the locked mode, accepted user input may be substantially limited to answering incoming calls and the entry of the predetermined password to unlock the device 201, typically in response to a prompt by the device.

An audio alert may be issued via the device speaker 256. The audio alert could be a single sound or a repeating sound. The sound emitted by the device speaker 256 during an audio alert could be a ringtone, "beep" or tone, or a special device drop sound such as a special high-volume alert sound. In some embodiments, the audio alert may be periodic or repeating and increase in frequency and/or volume over time. In some embodiments, the device 201 may be configured to ignore the normal audio bypass of the speaker 256 when headphones or another earpiece is connected to issue the audio alert directly from the speaker 256 even when headphones are connected. The audio alert should be issued at a volume sufficient for the device user to hear from a short distance. This allows the device user to hear the audio alert upon a device drop or shortly thereafter. Vibrations of a vibrator or buzzer may also create noise which may alert the device user of a device drop.

A visual alert may comprise the activation (e.g., turning on) of the display screen 204. If the display screen 204 is an LCD screen or other display screen which comprises a backlight, the backlight may be activated/turned on. The display screen 204 may be activated at a high brightness to increase the likelihood of being seen by the device user. In some embodiments, the image displayed on the display screen 204 may be selected to increase the brightness created by turning on or "flashing" the display screen 204. The visual alert may be useful in locating a lost device at night or in a dark environment. In some embodiments, the display screen 204 may be turned on and off rapidly to create a flashing effect. In some embodiments, the visual alert may comprise a pattern of time-varying visual effects on the display screen 204, such as alternating low- and high-brightness visual patterns, which could be presented in a flashing or blinking sequence. In other embodiments, the visual alert may also comprise text and/or graphics providing a message notifying the device user that the device has been dropped and/or that the device may have been damaged. In some embodiments, an LED or other notification light of the device 201 may be activated or flashed instead of, or in addition to, the display screen 204.

The alert may also comprise sending an electronic communication via a wireless communication link. The wireless communication link may comprise the communications subsystem 211, the short-range wireless communication subsystem 272, or both. The electronic communication may be sent in addition to, or instead of, a visual, audio or physical indication. The communication may be an email message, text message (e.g., Short Message Service (SMS) message), Multimedia Messaging Service (MMS) message, instant messaging (IM) message, voice message (e.g., a device lost message which may be pre-recorded or generated via text-to-speech synthesis based on, for example, the device location as described below), or other electronic communication. The communication is sent from the device 201 to one or more recipients via the wireless network 101. More than one type of communication may be sent in some embodiments.

The communication may be sent to one or more designated addresses, depending on the type of communication. For example, in some embodiments, when an email message is sent, one or more secondary email addresses may be designated to receive the communication rather than the primary email address assigned to the device 201, for example, by the wireless carrier. The secondary email addresses may include the address for the device user's home email account when the device 201 belongs to the user's employer, and include the address for device user's work email account when the device 201 is the user's personal device. The secondary email addresses may include the email address for an IT administrator, for example, of the user's employer when the device 201 is a work device. Because the email account(s) associated with the device 201 may be accessible via other means, for example from the device user's home and/or work computer, the communication could be sent to the primary email address of the device 201 in addition to the secondary email address. The address could also be telephone numbers for SMS, MMS, or voice messages, or uniform resource locators (URLs) for other electronic communications, such as Session Initiation Protocol (SIP) or Hypertext Transfer Protocol (HTTP) communications.

Depending on the type of electronic communication, in some embodiments the electronic communication may comprise text, graphics, digital image(s), voice data, or any combination thereof. In embodiments in which the device 201 includes a GPS subsystem capable of determining the location of the device 201, the device location may be determined and included as part of the electronic communication. The location may be in terms of a street address, GPS coordinates, or both. In some embodiments, a map of the device location may be generated using a mapping application on device 201 and included in the electronic communication as an embedded object or an attachment to the electronic communication. The map may be included addition to, or instead of the location. Rather than using a GPS subsystem, the device location may alternatively be determined using triangulation based on the distance to the various base stations 108 in the wireless network 101. Triangulation-based device location may be added to the electronic communication by the device 201 if this information is known to it, or a component of the wireless network 101 or the wireless connector system 120 after the electronic communication is sent by the device 201.

In some embodiments, the device location and/or map of the device location may be periodically determined and included in electronic communications periodically sent by the device 201, for example, when the device 201 is in the lost device mode. This periodic reporting provides a device location record for tracking purposes. Location information may be sent to the IT administrator and thereafter posted on a corresponding website for access by the device user for easier recovery.

In some embodiments, the device 201 may include a camera (not shown) which may be used to take a digital image. The digital image is then included in the electronic communication as an embedded object or an attachment to the electronic communication. The digital image may be included instead of, or in addition to, the device location and/or a map. The digital image may be useful for the device user in determining the device location as it may depict the surroundings of the device 201. The digital image may be particularly useful when the device 201 is in an indoor environment in which the GPS subsystem and/or communication subsystem 211 may be unable to determine device location. In some embodiments, digital images may be taken periodically and included in electronic communications periodically sent by the device 201, for example, when the device 201 is in lost device mode. This periodic reporting provides a visual record of the device surroundings.

The device 201 may be configured to issue more than one type of alert, possibly at different times. In some embodiments, the device 201 may be configured to issue a local alert comprising one or any combination of a visual, audio and physical indication in response to receiving a device drop notification from the drop detection module 226. After issuing the local alert, the operating system 223 then monitors the output of the accelerometer 310 for any output which indicates movement of the device 201. If the output of the accelerometer 310 does not indicate movement of the device 201 within a predetermined duration (e.g., 5, 10 or 15 minutes) from the device drop notification, the device 201 will send an electronic communication as described above. In these embodiments, movement of the device 201 is interpreted as the device user picking up the device 201 and, therefore, as recovery of the device 201. Conversely, the lack of movement of the device 201 is interpreted as the device 201 remaining in a lost or potentially lost state.

In some embodiments, periodic or repeating alerts, including visual, audio and physical indications and sending of electronic communications, have a fixed duration to preserve the life of the battery 238 which would otherwise be quickly drained if periodic or repeating alerts were issued indefinitely.

The GUI of the device 201 may allow the type of alerts to be issued and the alert parameters to be set by the device user. Examples of some of the configurable alert parameters will now be described. These examples are intended to be non-limiting. In terms of audio alerts, the type of audio alert, its volume, frequency and/or duration may be configurable. In terms of visual alerts, the type of visual alert, its brightness, frequency and/or duration may be configurable. In terms of physical alerts, the type of vibration or other physical alert, its frequency and/or duration may be configurable. In terms of electronic communications, the type, content and address of the electronic communication may be configurable.

Next, in optional step 410 security measures may be automatically performed when the device 201 has not been recovered within a predetermined duration (e.g., a day or more) of the device drop notification. The security measures may comprise initiating a locked mode on the device 201 when one has not already been initiated. The security measures may comprise performing a data security action in addition to, or instead of, initiating a locked mode on the device 201. The data security action may comprise erasing all or selected data from the memory 244 of the device 201. In some embodiments, user data may be erased while maintaining the operating system 223, applications 225, drop detection module 226 and service data. As will be appreciated by persons skilled in the art, service data comprises the data required by the device 201 to establish and maintain communication with the wireless network 101 (wireless network service data) and the wireless gateway 110 (gateway service data), such as service books, encryption keys, IT policy data and other identifying information required for wireless communication. In other embodiments, both user data and service data may be erased while maintaining the operating system 223, applications 225 and drop detection module 226. In other embodiments, the data security action may comprise encrypting user data and/or service data while maintaining the operating system 223, applications 225 and drop detection module 226 in unencrypted form.

While a three-axis accelerometer has been described in the foregoing description, an accelerometer having fewer sensing axes could be used in other embodiments.

While the operations 400 have been described as occurring in a particular order, it will be appreciated to persons skilled in the art that some of the steps may be performed in a different order provided that the result of the changed order of any given step will not prevent or impair the occurrence of subsequent steps. Furthermore, some of the steps described above may be combined in other embodiments, and some of the steps described above may be separated into a number of sub-steps in other embodiments.

Example Wireless Communication System

In order to facilitate an understanding of one possible environment in which example embodiments described herein can operate, reference is made to FIG. 1 which shows in block diagram form a communication system 100 in which example embodiments of the present disclosure can be applied. The communication system 100 comprises a number of mobile communication devices 201 which may be connected to the remainder of system 100 in any of several different ways. Accordingly, several instances of mobile communication devices 201 are depicted in FIG. 1 employing different example ways of connecting to system 100. Mobile communication devices 201 are connected to a wireless network 101 which may comprise one or more of a Wireless Wide Area Network (WWAN) 201 and a Wireless Local Area Network (WLAN) 104 or other suitable network arrangements. In some embodiments, the mobile communication devices 201 are configured to communicate over both the WWAN 201 and WLAN 104, and to roam between these networks. In some embodiments, the wireless network 101 may comprise multiple WWANs 201 and WLANs 104.

The WWAN 201 may be implemented as any suitable wireless access network technology. By way of example, but not limitation, the WWAN 201 may be implemented as a wireless network that includes a number of transceiver base stations 108 (one of which is shown in FIG. 1) where each of the base stations 108 provides wireless Radio Frequency (RF) coverage to a corresponding area or cell. The WWAN 201 is typically operated by a mobile network service provider that provides subscription packages to users of the mobile communication devices 201. In some embodiments, the WWAN 201 conforms to one or more of the following wireless network types: Mobitex Radio Network, DataTAC, GSM (Global System for Mobile Communication), GPRS (General Packet Radio System), TDMA (Time Division Multiple Access), CDMA (Code Division Multiple Access), CDPD (Cellular Digital Packet Data), iDEN (integrated Digital Enhanced Network), EvDO (Evolution-Data Optimized) CDMA2000, EDGE (Enhanced Data rates for GSM Evolution), UMTS (Universal Mobile Telecommunication Systems), HSPDA (High-Speed Downlink Packet Access), IEEE 802.16e (also referred to as Worldwide Interoperability for Microwave Access or "WiMAX), or various other networks. Although WWAN 201 is described as a "Wide-Area" network, that term is intended herein also to incorporate wireless Metropolitan Area Networks (WMAN) and other similar technologies for providing coordinated service wirelessly over an area larger than that covered by typical WLANs.

The WWAN 201 may further comprise a wireless network gateway 110 which connects the mobile communication devices 201 to transport facilities 112, and through the transport facilities 112 to a wireless connector system 120. Transport facilities may include one or more private networks or lines, the public Internet, a virtual private network, or any other suitable network. The wireless connector system 120 may be operated, for example, by an organization or enterprise such as a corporation, university, or governmental department, which allows access to a network 124 such as an internal or enterprise network and its resources, or the wireless connector system 120 may be operated by a mobile network provider. In some embodiments, the network 124 may be realised using the Internet rather than an internal or enterprise network.

The wireless network gateway 110 provides an interface between the wireless connector system 120 and the WWAN 201, which facilitates communication between the mobile communication devices 201 and other devices (not shown) connected, directly or indirectly, to the WWAN 201. Accordingly, communications sent via the mobile communication devices 201 are transported via the WWAN 201 and the wireless network gateway 110 through transport facilities 112 to the wireless connector system 120. Communications sent from the wireless connector system 120 are received by the wireless network gateway 110 and transported via the WWAN 201 to the mobile communication devices 201.

The WLAN 104 comprises a wireless network which, in some embodiments, conforms to IEEE 802.11x standards (sometimes referred to as Wi-Fi) such as, for example, the IEEE 802.11a, 802.11b and/or 802.11g standard. Other communication protocols may be used for the WLAN 104 in other embodiments such as, for example, IEEE 802.11n, IEEE 802.16e (also referred to as Worldwide Interoperability for Microwave Access or "WiMAX"), or IEEE 802.20 (also referred to as Mobile Wireless Broadband Access). The WLAN 104 includes one or more wireless RF Access Points (AP) 114 (one of which is shown in FIG. 1) that collectively provide a WLAN coverage area.

The WLAN 104 comprises a wireless network which, in some embodiments, conforms to IEEE 802.11x standards (sometimes referred to as Wi-Fi) such as, for example, the IEEE 802.11a, 802.11b and/or 802.11g standard. Other communication protocols may be used for the WLAN 104 in other embodiments such as, for example, IEEE 802.11n, IEEE 802.16e (also referred to as Worldwide Interoperability for Microwave Access or "WiMAX"), or IEEE 802.20 (also referred to as Mobile Wireless Broadband Access). The WLAN 104 includes one or more wireless RF Access Points (AP) 114 (one of which is shown in FIG. 1) that collectively provide a WLAN coverage area.

The WLAN 104 may be a personal network of the user, an enterprise network, or a hotspot offered by an Internet service provider (ISP), a mobile network provider, or a property owner in a public or semi-public area, for example. The access points 114 are connected to an access point (AP) interface 116 which may connect to the wireless connector system 120 directly (for example, if the access point 114 is part of an enterprise WLAN 104 in which the wireless connector system 120 resides), or indirectly as indicated by the dashed line if FIG. 1 via the transport facilities 112 if the access point 14 is a personal Wi-Fi network or Wi-Fi hotspot (in which case a mechanism for securely connecting to the wireless connector system 120, such as a virtual private network (VPN), may be required). The AP interface 116 provides translation and routing services between the access points 114 and the wireless connector system 120 to facilitate communication, directly or indirectly, with the wireless connector system 120.

The wireless connector system 120 may be implemented as one or more servers, and is typically located behind a firewall 113. The wireless connector system 120 manages communications, including email communications, to and from a set of managed mobile communication devices 201. The wireless connector system 120 also provides administrative control and management capabilities over users and mobile communication devices 201 which may connect to the wireless connector system 120.

The wireless connector system 120 allows the mobile communication devices 201 to access the network 124 and connected resources and services such as a messaging server 132 (for example, a Microsoft Exchange™, IBM Lotus Domino™, or Novell GroupWise™ email server), and a content server 134 for providing content such as Internet content or content from an organization's internal servers, and application servers 136 for implementing server-based applications such as instant messaging (IM) applications to mobile communication devices 201.

The wireless connector system 120 typically provides a secure exchange of data (e.g., email messages, personal information manager (PIM) data, and IM data) with the mobile communication devices 201. In some embodiments, communications between the wireless connector system 120 and the mobile communication devices 201 are encrypted. In some embodiments, communications are encrypted using a symmetric encryption key implemented using Advanced Encryption Standard (AES) or Triple Data Encryption Standard (Triple DES) encryption. Private encryption keys are generated in a secure, two-way authenticated environment and are used for both encryption and decryption of data. In some embodiments, the private encryption key is stored only in the user's mailbox on the messaging server 132 and on the mobile communication device 201, and can typically be regenerated by the user on mobile communication devices 201. Data sent to the mobile communication devices 201 is encrypted by the wireless connector system 120 using the private encryption key retrieved from the user's mailbox. The encrypted data, when received on the mobile communication devices 201, is decrypted using the private encryption key stored in memory. Similarly, data sent to the wireless connector system 120 from the mobile communication devices 201 is encrypted using the private encryption key stored in the memory of the mobile communication device 201. The encrypted data, when received on the wireless connector system 120, is decrypted using the private encryption key retrieved from the user's mailbox.

The wireless network gateway 110 is adapted to send data packets received from the mobile communication device 201 over the WWAN 201 to the wireless connector system 120. The wireless connector system 120 then sends the data packets to the appropriate connection point such as the messaging server 132, content server 134 or application servers 136. Conversely, the wireless connector system 120 sends data packets received, for example, from the messaging server 132, content server 134 or application servers 136 to the wireless network gateway 110 which then transmit the data packets to the destination mobile communication device 201. The AP interfaces 116 of the WLAN 104 provide similar sending functions between the mobile communication device 201, the wireless connector system 120 and network connection point such as the messaging server 132, content server 134 and application server 136.

The network 124 may comprise a private local area network, metropolitan area network, wide area network, the public Internet or combinations thereof and may include virtual networks constructed using any of these, alone, or in combination.

A mobile communication device 201 may alternatively connect to the wireless connector system 120 using a computer 117, such as desktop or notebook computer, via the network 124. A link 106 may be provided for exchanging information between the mobile communication device 201 and computer 117 connected to the wireless connector system 120. The link 106 may comprise one or both of a physical interface and short-range wireless communication interface. The physical interface may comprise one or combinations of an Ethernet connection, Universal Serial Bus (USB) connection, Firewire™ (also known as an IEEE 1394 interface) connection, or other serial data connection, via respective ports or interfaces of the mobile communication device 201 and computer 117. The short-range wireless communication interface may be a personal area network (PAN) interface. A personal area network is a wireless point-to-point connection meaning no physical cables are required to connect the two end points. The short-range wireless communication interface may comprise one or a combination of an infrared (IR) connection such as an Infrared Data Association (IrDA) connection, a short-range radio frequency (RF) connection such as one specified by IEEE 802.15.1 or the Bluetooth™ special interest group, or IEEE 802.15.3a, also referred to as Ultra-Wideband (UWB), or other PAN connection.

It will be appreciated that the above-described communication system is provided for the purpose of illustration only, and that the above-described communication system comprises one possible communication network configuration of a multitude of possible configurations for use with the mobile communication devices 201. The teachings of the present disclosure may be employed in connection with any other type of network and associated devices that are effective in implementing or facilitating wireless communication. Suitable variations of the communication system will be understood to a person of skill in the art and are intended to fall within the scope of the present disclosure.

While the present disclosure is primarily described in terms of methods, a person of ordinary skill in the art will understand that the present disclosure is also directed to various apparatus such as a handheld electronic device including components for performing at least some of the aspects and features of the described methods, be it by way of hardware components, software or any combination of the two, or in any other manner. Moreover, an article of manufacture for use with the apparatus, such as a pre-recorded storage device or other similar computer readable medium including program instructions recorded thereon, or a computer data signal carrying computer readable program instructions may direct an apparatus to facilitate the practice of the described methods. It is understood that such apparatus, articles of manufacture, and computer data signals also come within the scope of the present disclosure.

The term "computer readable medium" as used herein means any medium which can store instructions for use by or execution by a computer or other computing device including, but not limited to, a portable computer diskette, a hard disk drive (HDD), a random access memory (RAM), a read-only memory (ROM), an erasable programmable-read-only memory (EPROM) or flash memory, an optical disc such as a Compact Disc (CD), Digital Versatile Disc (DVD) or Blu-ray™ Disc, and a solid state storage device (e.g., NAND flash or synchronous dynamic RAM (SDRAM)).

The various embodiments presented above are merely examples and are in no way meant to limit the scope of this disclosure. Variations of the innovations described herein will be apparent to persons of ordinary skill in the art, such variations being within the intended scope of the present application. In particular, features from one or more of the above-described embodiments may be selected to create alternative embodiments comprised of a sub-combination of features which may not be explicitly described above. In addition, features from one or more of the above-described embodiments may be selected and combined to create alternative embodiments comprised of a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. A method for providing notification of a device drop on an electronic device having a processor coupled to a memory and an accelerometer, the method comprising:
   receiving an input from the accelerometer;
   monitoring to detect one or more secondary indications of a device drop; and
   issuing an alert when the input indicates a freefall event and at least one secondary indication of a device drop has been detected.

2. The method of claim 1, wherein the secondary indication of a device drop is inactivity of the electronic device, the method comprising:
   issuing the alert when a freefall event and after a predetermined duration of inactivity of the electronic device has elapsed.

3. The method of claim 1, wherein the secondary indication of a device drop is impact of the electronic device, the method comprising:
   issuing the alert when the input indicates a freefall event and impact of the electronic device within a predetermined duration of the freefall event.

4. The method of claim 1, wherein the secondary indication of a device drop is whether the electronic device is out of a holster, the method comprising determining whether the electronic device is out of a holster; wherein the alert is issued when the input indicates a freefall event and the electronic device is out of the holster.

5. The method of claim 4, wherein the alert is issued when the electronic device is out of the holster and the input indicates freefall event within a predetermined duration of the electronic device being out of the holster.

6. The method of claim 1, wherein the secondary indication of a device drop is based on images acquired by a digital camera of the electronic device, the method comprising:
   capturing a series of two or more images using a digital camera of the electronic device when the input indicates a freefall event;
   comparing the images in the series to determine a change in a reference value of the images; and
   determining whether the reference value is greater than or equal to a predetermined threshold;
   wherein the alert is issued when the input indicates the freefall event and the reference value is greater than or equal to the predetermined threshold.

7. The method of claim 1, wherein the alert comprises one or any combination of a visual, audio and physical indication.

8. The method of claim 1, further comprising automatically performing a data security action within a predetermined duration of the input indicating a freefall event.

9. The method of claim 1, wherein the issuing includes sending an electronic communication to a designated address over a wireless communication link, the electronic communication including a map of a location of the electronic device.

10. The method of claim 9, wherein the electronic communication includes the location of the electronic device.

11. The method of claim 10, further comprising:
determining the location of the electronic device; and
generating the map of the location of the electronic device using a mapping application on the electronic device.

12. The method of claim 11, further comprising generating the electronic communication to include the map and location of the electronic device.

13. The method of claim 9, wherein the alert comprises one or any combination of a visual, audio and physical indication.

14. The method of claim 9, further comprising automatically performing a data security action within a predetermined duration of the input indicating a freefall event.

15. A portable electronic device, comprising:
a controller;
a memory coupled to the controller;
an accelerometer coupled to the controller for measuring acceleration;
the controller being configured for receiving an input from the accelerometer, monitoring to detect one or more secondary indications of a device drop, and issuing an alert when the input indicates a freefall event and at least one secondary indication of a device drop has been detected.

16. The device of claim 15, wherein the controller is configured to issue the alert when the input indicates a freefall event and after a predetermined duration of inactivity of the electronic device has elapsed.

17. The device of claim 15, wherein the controller is configured to issue the alert when the input indicates a freefall event and the input indicates impact of the electronic device within a predetermined duration of the freefall event.

18. The device of claim 15, wherein the controller is configured to issue the alert when the input indicates a freefall event and the electronic device is out of the holster.

19. The device of claim 18, wherein the alert is issued when the electronic device is out of the holster and the input indicates a freefall event within a predetermined duration of the electronic device being out of the holster.

20. The device of claim 15, further comprising a digital camera coupled to the controller, wherein the controller is further configured to capture a series of two or more images using the digital camera when the input indicates a freefall event, compare the images in the series to determine a change in a reference value of the images, determine whether the reference value is greater than or equal to a predetermined threshold, and issue the alert when the input indicates a freefall event and the reference value is greater than or equal to the predetermined threshold.

* * * * *

UNITED STATES PATENT AND TRADEMARK OFFICE
CERTIFICATE OF CORRECTION

PATENT NO. : 8,344,901 B2  
APPLICATION NO. : 13/240573  
DATED : January 1, 2013  
INVENTOR(S) : Piotr Konrad Tysowski Page 1 of 1

It is certified that error appears in the above-identified patent and that said Letters Patent is hereby corrected as shown below:

On the title page, item (62), "Division of application No. 12/360,153, filed on Jan. 27, 2009, now Pat. No. 8,044,818" should read --Continuation of the U.S. application No. 12/360,153, filed on Jan. 27, 2009, now Pat. No. 8,044,818.--

Signed and Sealed this  
Second Day of April, 2013

Teresa Stanek Rea  
*Acting Director of the United States Patent and Trademark Office*